United States Patent
Shi et al.

(10) Patent No.: US 12,317,286 B2
(45) Date of Patent: May 27, 2025

(54) PUSCH TRANSMISSION METHOD, TERMINAL, AND NETWORK DEVICE

(71) Applicant: VIVO MOBILE COMMUNICATION CO., LTD., Dongguan (CN)

(72) Inventors: Yuan Shi, Dongguan (CN); Peng Sun, Dongguan (CN); Yang Song, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 257 days.

(21) Appl. No.: 17/888,441

(22) Filed: Aug. 15, 2022

(65) Prior Publication Data
US 2022/0394748 A1 Dec. 8, 2022

Related U.S. Application Data

(63) Continuation of application No. PCT/CN2021/076495, filed on Feb. 10, 2021.

(30) Foreign Application Priority Data

Feb. 17, 2020 (CN) .......................... 202010096347.6

(51) Int. Cl.
*H04W 72/23* (2023.01)
(52) U.S. Cl.
CPC .................. *H04W 72/23* (2023.01)
(58) Field of Classification Search
CPC ............. H04W 72/23; H04W 72/1268; H04W 72/232; H04W 72/535; H04W 72/046; H04L 1/08; H04L 5/0051; H04B 7/0456
See application file for complete search history.

(56) References Cited

U.S. PATENT DOCUMENTS

| | | | |
|---|---|---|---|
| 2019/0082456 A1 | 3/2019 | Kim et al. | |
| 2020/0344781 A1* | 10/2020 | Li | H04L 1/1664 |
| 2020/0403735 A1* | 12/2020 | Zhao | H04L 1/1896 |
| 2022/0330221 A1 | 10/2022 | Pan et al. | |
| 2022/0353861 A1* | 11/2022 | Wu | H04W 72/569 |

FOREIGN PATENT DOCUMENTS

| | | |
|---|---|---|
| CN | 110034905 A | 7/2019 |
| CN | 110536399 A | 12/2019 |
| CN | 110536450 A | 12/2019 |

(Continued)

OTHER PUBLICATIONS

Extended European Search Report issued in related European Application No. 21757177.7, mailed May 16, 2023, 13 pages.

(Continued)

*Primary Examiner* — Dady Chery
(74) *Attorney, Agent, or Firm* — IPX PLLC

(57) ABSTRACT

A physical uplink shared channel (PUSCH) transmission method, a terminal, and a network device are provided. The method includes: receiving downlink control information (DCI), where the DCI is used to schedule M times of PUSCH transmission, and M is an integer greater than 1; determining a target identifier associated with each PUSCH; and sending the PUSCH based on target control information that is in the DCI and that corresponds to the target identifier; where target control information corresponding to PUSCHs in at least twice in the M times of PUSCH transmission is different.

18 Claims, 4 Drawing Sheets

---

Receive downlink control information DCI, where the DCI is used to schedule M times of PUSCH transmission — 201

Determine a target identifier associated with each PUSCH — 202

Send the PUSCH based on target control information that is in the DCI and that corresponds to the target identifier — 203

(56) References Cited

FOREIGN PATENT DOCUMENTS

| CN | 110536452 A | 12/2019 |
| CN | 110752908 A | 2/2020 |
| EP | 3860284 A1 | 8/2021 |
| EP | 4016910 A1 | 6/2022 |
| WO | 2021161272 A1 | 8/2021 |

OTHER PUBLICATIONS

NTT Docomo et al "Enhancements on multi-TRP/panel transmission", 3GPP R1-1911184, Oct. 2019, 13 pages.

First Office Action issued in related Chinese Application No. 202010096347.6, mailed Sep. 1, 2022, 15 pages.

International Search Report issued in corresponding International Application No. PCT/CN2021/076495, mailed May 10, 2021, 4 pages.

Lenovo et al, "Discussion on UL multi-panel transmission", 3GPP TSG RAN WG1 Meeting #96bis R1-1904574, Apr. 12, 2019.

\* cited by examiner

PUSCH TRANSMISSION METHOD, TERMINAL, AND NETWORK DEVICE

CROSS-REFERENCE TO RELATED APPLICATIONS

This application is a continuation of International Application No. PCT/CN2021/076495, filed Feb. 10, 2021, which claims priority to Chinese Patent Application No. 202010096347.6, filed Feb. 17, 2020. The entire contents of each of the above-referenced applications are expressly incorporated herein by reference.

TECHNICAL FIELD

The present disclosure relates to the field of communications technologies, and in particular, to a PUSCH transmission method, a terminal, and a network device.

BACKGROUND

In a current communications system, scheduling of Physical Uplink Shared Channel (PUSCH) transmission is usually scheduled by using Downlink Control Information (DCI). In the current system, to improve the reliability of PUSCH transmission, a terminal may be scheduled by using DCI to perform PUSCH transmission for multiple times. In the prior art, control information used for multiple times of PUSCH transmission generally remains unchanged, and consequently, the reliability of PUSCH transmission is low.

SUMMARY

Embodiments of the present disclosure provide a PUSCH transmission method, a terminal, and a network device.

According to a first aspect, an embodiment of the present disclosure provides a PUSCH transmission method, performed by a terminal and including:

receiving downlink control information DCI, where the DCI is used to schedule M times of PUSCH transmission, and M is an integer greater than 1;

determining a target identifier associated with each PUSCH; and sending the PUSCH based on target control information that is in the DCI and that corresponds to the target identifier; where target control information corresponding to PUSCHs in at least twice in the M times of PUSCH transmission is different.

According to a second aspect, an embodiment of the present disclosure provides a PUSCH transmission method, performed by a network device and including:

sending downlink control information DCI, where the DCI is used to schedule a terminal to perform M times of PUSCH transmission, and M is an integer greater than 1; and receiving a PUSCH that is sent by a terminal based on target control information in the DCI; where a target identifier associated with the PUSCH is the same as a target identifier associated with the target control information, and target control information corresponding to PUSCHs in at least twice in the M times of PUSCH transmission is different.

According to a third aspect, an embodiment of the present disclosure provides a terminal, including:

a first receiving module, configured to receive downlink control information DCI, where the DCI is used to schedule M times of PUSCH transmission, and M is an integer greater than 1;

a determining module, configured to determine a target identifier associated with each PUSCH; and a first sending module, configured to send the PUSCH based on target control information that is in the DCI and that corresponds to the target identifier; where target control information corresponding to PUSCHs in at least twice in the M times of PUSCH transmission is different.

According to a fourth aspect, an embodiment of the present disclosure provides a network device, including:

a second sending module, configured to send downlink control information DCI, where the DCI is used to schedule a terminal to perform M times of PUSCH transmission, and M is an integer greater than 1; and a second receiving module, configured to receive a PUSCH that is sent by the terminal based on target control information in the DCI; where a target identifier associated with the PUSCH is the same as a target identifier associated with the target control information, and target control information corresponding to PUSCHs in at least twice in the M times of PUSCH transmission is different.

According to a fifth aspect, an embodiment of the present disclosure provides a terminal, including a processor, a memory, and a program that is stored in the memory and that can run on the processor, and when the program is executed by the processor, steps of the foregoing PUSCH transmission method are implemented.

According to a sixth aspect, an embodiment of the present disclosure provides a network device, including a processor, a memory, and a program that is stored in the memory and that can run on the processor, and when the program is executed by the processor, steps of the foregoing PUSCH transmission method are implemented.

According to a seventh aspect, an embodiment of the present disclosure provides a computer-readable storage medium, where the computer-readable storage medium stores a computer program, and when the computer program is executed by a processor, steps of the foregoing PUSCH transmission method are implemented.

In the embodiments of the present disclosure, downlink control information DCI is received, where the DCI is used to schedule M times of PUSCH transmission, and M is an integer greater than 1; a target identifier associated with each PUSCH is determined; and the PUSCH is sent based on target control information that is in the DCI and that corresponds to the target identifier; where target control information corresponding to PUSCHs in at least twice in the M times of PUSCH transmission is different. In this way, when PUSCH transmission is performed for multiple times, different control information is used to control PUSCH transmission, so that reliability of PUSCH transmission can be improved.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts shall fall within the protection scope of the present disclosure.

The term "include" and any modification thereof in the specification and claims of this application are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" is used in the specification and claims to indicate at least one of the connected objects, for example, A and/or B indicates three cases: only A exists, only B exists, and both A and B exist.

In the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The embodiments of the present disclosure are described below with reference to the accompanying drawings. A PUSCH transmission method, a terminal, and a network device provided in the embodiments of the present disclosure may be performed by a wireless communications system. The wireless communications system may be a 5G system, an Evolved Long Term Evolution (eLTE) system, or a subsequent evolved communications system.

Figure 1:
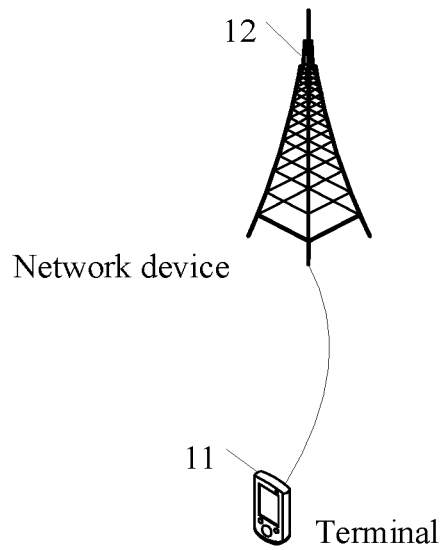
FIG. 1 is a structural diagram of a network system to which an embodiment of the present disclosure is applicable.

FIG. 1 is a structural diagram of a network system to which an embodiment of the present disclosure is applicable. As shown in FIG. 1, the network system includes a terminal 11 and a network device 12. The terminal 11 may be a user terminal or another terminal side device such as a mobile phone, a tablet personal computer, a laptop computer, a Personal Digital Assistant (PDA), a Mobile Internet Device (MID), or a wearable device. It should be noted that a specific type of the terminal 11 is not limited in the embodiments of the present disclosure. The network device 12 may be a 5G base station, a base station of a later version, or a base station in another communications system, or may be referred to as a NodeB, an evolved NodeB, a Transmission Reception Point (TRP), an Access Point (AP), or another word in the field. The network device is not limited to a specific technical term provided that a same technical effect is achieved. In addition, the network device 12 may be a Master Node (MN) or a Secondary Node (SN). It should be noted that in the embodiments of the present disclosure, only the 5G base station is used as an example, but a specific type of the network device is not limited.

Figure 2:
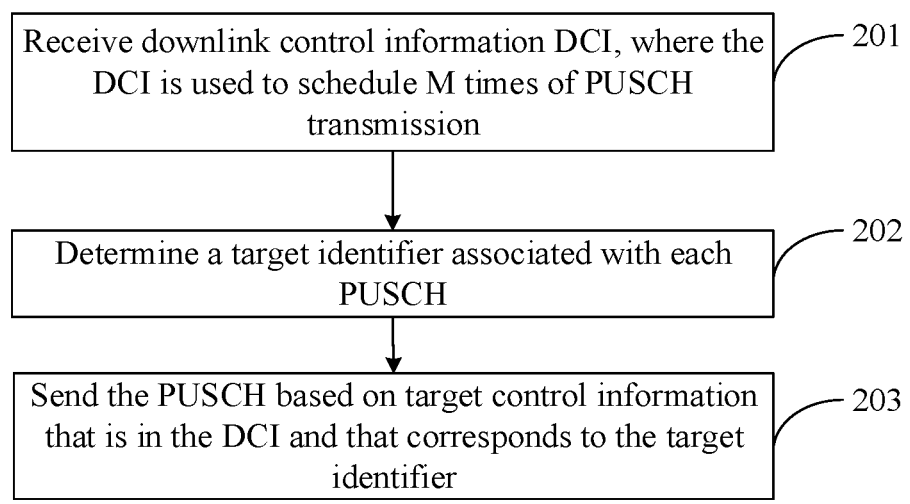
FIG. 2 is a flowchart of a PUSCH transmission method according to an embodiment of the present disclosure.

FIG. 2 is a flowchart of a PUSCH transmission method according to an embodiment of the present disclosure. The method is performed by a PUSCH transmission method. As shown in FIG. 2, the method includes the following steps:

Step 201: Receive downlink control information DCI, where the DCI is used to schedule M times of PUSCH transmission, and M is an integer greater than 1.

Step 202: Determine a target identifier associated with each PUSCH.

Step 203: Send the PUSCH based on target control information that is in the DCI and that corresponds to the target identifier.

In this embodiment of the present disclosure, the M times of PUSCH transmission may be understood as M repeated times of PUSCH transmission performed based on a same Transport Block (TB) scheduled by using one piece of DCI. The M times of PUSCH transmission may be a PUSCH sent by the terminal to a same TRP, or may be PUSCHs sent to different TRPs.

The foregoing target identifier may be understood as being associated with the number of PUSCH transmission times and/or a TPR, where different target identifiers are associated with different target control information.

In an embodiment, when the target identifier is associated with the number of transmission times, the sending the PUSCH based on the control information corresponding to the target identifier may be understood as: sending the $n^{th}$ time of PUSCH transmission by using the target control information in the DCI, where a target identifier associated with the target control information is the same as a target identifier associated with the $n^{th}$ time of PUSCH transmission. In this embodiment, each target identifier may be associated with one or more transmission times, and different target identifiers are associated with different transmission times. For example, M is equal to 4, quantities of transmission times associated with a target identifier 1 are 1 and 3, quantities of transmission times associated with a target identifier 2 are 2 and 4, the target identifier 1 is associated with control information 1, and the target identifier 2 is associated with control information 2. In this case, in the first time and the third time of PUSCH transmission, the PUSCH is sent by using the control information 1, and in the second time and fourth time of PUSCH transmission, the PUSCH is sent by using the control information 2.

In another embodiment, when the target identifier is associated with the TRP, the sending the PUSCH based on the control information corresponding to the target identifier may be understood as: sending, by using the target control information in the DCI, PUSCH transmission to be sent to a target TRP, where a target identifier associated with the target control information is the same as a target identifier associated with the target TRP. In this embodiment, each target identifier may be associated with one or more TRPs, and different target identifiers are associated with different TRPs. For example, a target identifier 1 is associated with TRP1, and a target identifier 2 is associated with TRP2, the target identifier 1 is associated with control information 1, and the target identifier 2 is associated with the control information 2. In this case, the PUSCH is sent to TRP1 by using the control information 1, and the PUSCH is sent to TRP2 by using the control information 2. Because different target identifiers are associated with different TRPs, when the PUSCH is repeatedly sent, the PUSCH may be sent to different TRPs. In this way, when the terminal is shielded from one of the TRPs, the terminal may further send the PUSCH to another TRP, thereby further effectively improving reliability of PUSCH transmission.

In still another embodiment, when the target identifier is associated with the TRP and the number of transmission times, the sending the PUSCH based on the control information corresponding to the target identifier may be understood as: sending the $n^{th}$ time of PUSCH transmission to a target TRP by using the target control information in the DCI, where a target identifier associated with the target control information, a target identifier associated with the target TRP, and a target identifier associated with the $n^{th}$ time of PUSCH transmission are the same.

In this embodiment of the present disclosure, downlink control information DCI is received, where the DCI is used to schedule M times of PUSCH transmission, and M is an integer greater than 1; a target identifier associated with each PUSCH is determined; and the PUSCH is sent based on target control information that is in the DCI and that corresponds to the target identifier, where PUSCHs in at least twice in the M times of PUSCH transmission correspond to different target control information. In this way, when PUSCH transmission is performed for multiple times, different control information is used to control PUSCH transmission, so that reliability of PUSCH transmission can be improved.

In an embodiment, the DCI includes N groups of indication information, each group of indication information in the N groups of indication information includes M pieces of first indication information used to indicate a same function, the M pieces of first indication information are in a one-to-one correspondence with M target identifiers, and N is a positive integer.

The target control information includes one piece of first indication information in each group of indication information. The first indication information is indication information corresponding to a first indication field, and the first indication field includes at least one of a sounding reference signal resource indicator (SRS resource indicator, SRI) field, a layer and codebook indication (Precoding information and number of layers) field, a Redundancy version (RV) field, a Transmit Power Control (TPC) field, an antenna port field, an SRS request field, and a Channel State Information (CSI) request field.

In this embodiment, the TPC field may be understood as a TPC command for scheduled PUSCH (TPC command for scheduled PUSCH). The layer and codebook indication field is used to indicate a Transmit Precoding Matrix Indicator (TPMI) and the number of layers. The foregoing functions may be understood as functions indicated by the SRI field, the layer and codebook indication field, the redundancy version field, the power control field, the antenna port field, the SRS request field, and the CSI request field. The N groups of indication information may be understood as indication information corresponding to N indication fields, and the target control information may be understood as one piece of first indication information in each group of indication information. It is assumed that N is 2, which indicates indication information of two indication fields. The SRI field and the layer and codebook indication field are used as examples for description. If M is 2, the N groups of indication information may include two SRIs (that is, SRI indication information, such as SRI 1 and SRI 2) of the SRI field and the number of layers and two TPMIs indicated by the layer and codebook indication field (for example, both are two layers: TPMI 1 and TPMI 2). If both SRI 1 and TPMI 1 are associated with the target identifier 1, and both SRI 2 and TPMI 2 are associated with the target identifier 2, target control information corresponding to a PUSCH associated with the target identifier 1 includes SRI 1 and TPMI 1, and target control information corresponding to a PUSCH associated with the target identifier 2 includes SRI 2 and TPMI 2. For a case in which the PUSCH is repeatedly sent for four times, if the target identifier 1 is associated with the first time and the third time, and the target identifier 2 is associated with the second time and the fourth time, SRI 1 and TPMI 1 correspond to the first time and the third time of PUSCH sending, and SRI 2 and TPMI 2 correspond to the second time and the fourth time of PUSCH sending.

In an embodiment, an association relationship between the first indication information and the target identifier is specified in a protocol, configured by a network device, or reported by the terminal. Further, an association relationship between the target identifier and the number of transmission times and/or the TRP may also be specified in a protocol, configured by a network device, or reported by the terminal.

It should be noted that the M pieces of first indication information may be in one indication field or M indication fields.

In an embodiment, when the M pieces of first indication information are in one indication field, the M pieces of first indication information are independently coded, or the M pieces of first indication information are jointly coded.

In this embodiment, bit extension may be performed on the indication field, to include M pieces of indication information in one indication field. After extension, the M pieces of first indication information with a same function may be independently coded, or may be jointly coded. For example, after an indication field is extended to a total of 4 bits, when independent coding is used, the first 2 bits represent one piece of first indication information and are used to associate a target identifier, and the last 2 bits represent one piece of first indication information and are used to associate another target identifier. When joint coding is used, two types of information are indicated by using 4 bits, first information corresponds to one piece of first indication information, and second information corresponds to another piece of first indication information.

In another embodiment, when the M pieces of first indication information are in M indication fields, the M pieces of first indication information are independently coded.

In this embodiment, each indication field may include M indication fields, and one piece of first indication information is set in each indication field. For example, the DCI may include at least one of the following: M SRI fields, M layer and codebook indication fields, M redundancy version fields, M power control fields, M antenna port fields, M SRS request fields, or M CSI request fields.

In other words, in this embodiment, in a case that the target control information includes indication information of the SRI field, the DCI includes M SRI fields, and in this case, the M SRI fields are in one-to-one correspondence with M target identifiers. In a case that the target control information includes indication information of the layer and codebook indication field, the DCI includes M layer and codebook indication fields, and in this case, the M layer and codebook indication fields are in a one-to-one correspondence with M target identifiers.

Further, in a case that M pieces of layer and codebook indication information corresponding to the layer and codebook indication field meet a preset condition, the first piece of layer and codebook indication field in the M pieces of layer and codebook indication information is used to indicate precoding information and the number of layers, and the last M−1 pieces of layer and codebook indication information are only used to indicate the precoding information; where the M pieces of layer and codebook indication information are M pieces of first indication information corresponding to the layer and codebook indication field, and the preset condition includes any one of the following:

the M pieces of layer and codebook indication information are in a same indication field, and the M pieces of layer and codebook indication information are independently coded; or the M pieces of layer and codebook indication information are in M indication fields.

In this embodiment, that the last M−1 pieces of layer and codebook indication information do not indicate the number of layers may be understood as that the number of layers associated with TPMI indicated by the last M−1 pieces of layer and codebook indication information is the same as the number of layers associated with TPMI indicated by the first piece of layer and codebook indication information. Because the number of layers is not indicated in the last M−1 pieces of layer and codebook indication information, bit overheads of the layer and codebook indication field can be reduced.

In other words, in this embodiment, if the DCI includes multiple layer and codebook indication fields, or layer and codebook indication information in one layer and codebook indication field is independently coded, the number of layers used by a subsequent TPMI is the same as the number of layers used by the first TPMI.

In this embodiment, the first piece of layer and codebook indication information may be understood as: layer and codebook indication information that is the first piece in the M pieces of layer and codebook indication information in the DCI; or a target identifier associated with the first piece of layer and codebook indication information is the same as a target identifier associated with a PUSCH transmitted for the first time.

It should be understood that, in another embodiment, the first piece of layer and codebook indication information may further be understood as layer and codebook indication information associated with a target identifier with a smallest index of target identifier. In addition, it may be further understood as layer and codebook indication information associated with a TRP with a smallest TRP index.

Further, in an embodiment, the DCI further includes at least one piece of second indication information, a function indicated by the second indication information is different from a function indicated by the first indication information, and the M times of PUSCH transmission are controlled based on the second indication information.

In this embodiment of the present disclosure, the second indication information may be understood as indication information except the first indication information in all control information that is in the DCI and that is used to control PUSCH transmission. In other words, the second indication information other than the first indication information is general control information, and same control information is used for the M times of PUSCH transmission. Functions indicated by the second indication information are not described herein again.

In an embodiment, a same target identifier is associated with at least one piece of spatial beam information.

Further, different target identifiers may be set to be associated with different spatial beam information. It should be understood that spatial beam information associated with different target identifiers may be partially or completely different.

Further, the method further includes:

receiving target information, where the target information is used to configure and/or indicate enable information, and the enable information includes target identifier enable or target identifier disable.

In this embodiment, in a case that the target identifier is associated with the TRP, target identifier enable or disable may be understood as enabling or disabling multiple TRPs. When the target identifier is enabled, the terminal may send a PUSCH to at least two TRPs. When the target identifier is disabled, the terminal can send a PUSCH to only one TRP. The target information may be received before the DCI is received, to configure or indicate the enable information. The network device may indicate, by using a Medium Access Control Control Element (MAC CE) and/or Radio Resource Control (RRC) signaling, whether multiple TRPs of the UE are enabled or disabled.

In an embodiment, the enable may be separately activated or deactivated. In another embodiment, the TRP may be configured by RRC and the enable is activated or deactivated by a MAC CE, and RRC configuration includes configuring a plurality of TRP numbers and the like. To deactivate the enable may be understood as disabling.

It should be noted that when the network device does not enable multiple TRPs, the UE performs demodulation based on a normal DCI size. If the network device is enabled, the UE performs demodulation based on DCI sizes of multiple TRPs.

For better understanding of the present disclosure, the following describes implementation of the present disclosure in detail by using a specific example.

When single DCI is used to schedule uplink repeated transmission, at least one field includes multiple pieces of indication information with a same function. Association indication information (the association indication information corresponds to the target identifier) includes multiple pieces of indication information with different functions in the at least one field. A correspondence between the indication information in the at least one field and the association indication information and a correspondence between the association indication information and a sending sequence may be configured by a network, agreed-on in a protocol, or reported by a terminal.

When different association indication information is sent, different spatial beam information may be associated, same association indication information is associated with same spatial beam information, and same association indication information is associated with different spatial beam information.

For a field other than the at least one field, same field indication information is used for multiple times of repeated transmission.

For example, single DCI includes two pieces of SRI indication information and two pieces of layer and codebook indication information, and sending is repeated four times. First association indication information is associated with first SRI indication information and first layer and codebook indication information, and second association indication information is associated with second SRI indication information and second layer and codebook indication information. The first association indication information corresponds to the first time of sending and the third time of sending, and the second association indication information corresponds to the second time of sending and the fourth time of sending.

For example, single DCI includes indication information of two TPC fields, and sending is repeated four times. First TPC indication information is associated with a spatial beam 1, and second TPC indication information is associated with a spatial beam 2. The first TPC indication information corresponds to the first time of sending and the third time of sending, and the second TPC indication information corresponds to the second time of sending and the fourth time of sending. When the terminal repeatedly performs sending, the spatial beam 1 is used in the first time of sending and the third time of sending, and the spatial beam 2 is used in the second time of sending and the fourth time of sending.

In some embodiments, multiple pieces of indication information with a same function may be sent by using an independent field, or may be sent by using an extended field. This is described below.

1. An independent field may be understood as multiple fields.

The DCI includes at least one of the following: multiple SRI fields, multiple layer and codebook indication fields, multiple redundancy version fields, multiple power control fields, multiple antenna port fields, multiple SRS request fields, and multiple CSI request fields.

The multiple fields are independently coded.

In some embodiments, each of the fields is in a one-to-one correspondence with association indication information.

It should be noted that the network device may indicate, by using a MAC CE and/or RRC signaling, whether multiple TRPs on a network side of the UE are enabled or disabled. For example, this may include: separately activating enable or deactivating enable, and may also be configured by using RRC and enable is activated or deactivated by using a MAC CE. RRC configuration includes configuring multiple TRP numbers and the like.

2. The extended field may be understood as that bits of one field are extended to include multiple pieces of indication information.

The DCI includes at least one of the following for bit extension to enable an extended field: one SRI field, one layer and codebook indication field, one redundancy version field, one power control field, one antenna port field, one SRS request field, or one CSI request field.

In an embodiment, multiple pieces of indication information with a same function in the extended field are independently coded. For example, an extended field has a total of 4 bits, the first 2 bits are associated with first association indication information (or may be understood as that the first 2 bits are used to indicate indication information in the first association indication information), the last 2 bits are associated with second association indication information (or may be understood as that the last 2 bits are used to indicate indication information in the second association indication information), and vice versa.

In another embodiment, multiple pieces of indication information with a same function in the extended field are jointly coded. For example, an extended field has a total of 4 bits and indicates two types of information by using the 4 bits, first information corresponds to the first piece of indication information (associated with the first association indication information), and second information corresponds to the second piece of indication information (associated with the second association indication information), and vice versa.

For the independent field and the extended field:

If there are multiple layer and codebook indication fields, or layer and codebook indication information in the layer and codebook indication fields are independently coded, the number of layers associated with a subsequent TPMI is the same as the number of layers associated with the first TPMI.

If there are multiple redundancy versions, each piece of association indication information corresponds to one redundancy version.

If there is only one redundancy version, all association indication information corresponds to one redundancy version, including alternating and sequential methods.

For example, in an embodiment, single DCI schedules repeated PUSCH sending, and includes two pieces of association indication information, but the two pieces of association indication information do not include a redundancy version, that is, a redundancy version field in the DCI remains unchanged.

When there is only one redundancy version, a start sequence is 0, and an RV version sequence for PUSCH sending is 0, 0, 2, 2, 1, 1, 3, and 3.

A redundancy version sequence of the first association indication information is 0, 2, 1, and 3, and a redundancy version sequence of the second association indication information is 0, 2, 1, and 3.

In the alternating method, an RV version sequence for PUSCH sending is 0, 2, 1, 3, 0, 2, 1, and 3.

A redundancy version sequence of the first association indication information is 0, 1, 0, and 1, and a redundancy version sequence of the second association indication information is 2, 3, 2, and 3.

In another embodiment, single DCI schedules repeated PUSCH sending, and includes two pieces of association indication information, and the two pieces of association indication information each include one piece of redundancy version information.

Start sequences of two redundancy versions are 0 and 2, and an RV version sequence for PUSCH sending is 0, 2, 2, 1, 1, 3, 3, and 0.

A redundancy version sequence of the first association indication information is 0, 2, 1, and 3, and a redundancy version sequence of the second association indication information is 2, 1, 3, and 0.

In some embodiments, a method for reducing overheads of the layer and codebook indication field is provided.

For 2TRP, a codebook subset may be indicated by using the following table:

| Index for bit field mapping | Codebook subset |
| --- | --- |
| 0 | 1 layer: TPMI = 0 |
| 1 | 1 layer: TPMI = 1 |
| 2 | 2 layers: TPMI = 0 |
| 3 | 1 layer: TPMI = 2 |
| 4 | 1 layer: TPMI = 3 |
| 5 | 1 layer: TPMI = 4 |
| 6 | 1 layer: TPMI = 5 |
| 7 | 2 layers: TPMI = 1 |
| 8 | 2 layers: TPMI = 2 |
| 9-15 | Reserved |
| 0 | 1 layer: TPMI = 0 |
| 1 | 1 layer: TPMI = 1 |
| 2 | 2 layers: TPMI = 0 |
| 3 | Reserved |

The layer and codebook indication field includes two pieces of indication information. First layer and codebook indication information uses 4 bits to indicate an index 2, and second layer and codebook indication information uses only 2 bits to indicate the index 8 in the foregoing table. The two pieces of indication information are associated with a same number of layers.

In an embodiment, multiple pieces of indication information with a same function in the extended field are independently coded.

In a case that no supplementary uplink (SUL) is configured, the SRS request field in the DCI uses 2 bits to indicate an active state of a Sounding Reference Signal (SRS) resource set. If the DCI includes two pieces of association indication information, the two pieces of association indication information each includes one piece of SRS request indication information. If an extended field is used and independent coding is performed, the SRS request field includes 4 bits, the first 2 bits are used for the first association indication information, and the last 2 bits are used for the second association indication information.

If an extended field is used and independent coding is performed, the SRS request field includes 4 bits, the first 2 bits are used for the first association indication information, and the last 2 bits are used for the second association indication information.

There are a total of three SRS resource sets: an SRS resource set A, an SRS resource set B, and an SRS resource set C. Trigger state in the SRS resource set A (trigger state)=1, trigger state in the SRS resource set B=2, and trigger state in the SRS resource set C=2. The SRS resource set A and the SRS resource set B correspond to the first association indication information, and the SRS resource set C corresponds to the second association indication information.

For example, SRS request=0110. When single DCI is used to activate an SRS resource set, the SRS resource set A corresponding to the first association indication information is sent based on a sending slot of the SRS resource set A, and the SRS resource set C corresponding to the second association indication information is sent based on a sending slot of the SRS resource set C.

In some embodiments, for a field other than the field associated with the foregoing association indication information, same field indication information is used in multiple times of repeated transmission.

For a case of 2TRP and single DCI schedules repeated PUSCH sending, two pieces of association indication information are included, and the two pieces of association indication information each include one piece of redundancy version information. The DCI includes only one piece of layer and codebook indication information, for example, to indicate precoding information and number of layers of layers, and are used for two antenna ports. If a transmission precoding is disabled and a maximum number of layers is 2 (if transform precoder is disabled and maxRank=2), it corresponds to the index 2 (that is, 2 layers: TPMI=0) in the foregoing table.

Start sequences of two redundancy versions are 0 and 2, and sending is repeated eight times. Ab RV version for PUSCH sending and a corresponding TPMI sequence are as follows:
First time: RV 0, 2 layers: TPMI=0;
Second time: RV 2, 2 layers: TPMI=0;
Third time: RV 2, 2 layers: TPMI=0;
Fourth time: RV 1, 2 layers: TPMI=0;
Fifth time: RV 1, 2 layers: TPMI=0;
Sixth time: RV 3, 2 layers: TPMI=0;
Seventh time: RV 3, 2 layers: TPMI=0;
Eighth time: RV 0, 2 layers: TPMI=0;

In four times of repetition:
First time: RV 0, 2 layers: TPMI=0;
Second time: RV 2, 2 layers: TPMI=0;
Third time: RV 2, 2 layers: TPMI=0;
Fourth time: RV 1, 2 layers: TPMI=0;

In four times of repetitions, and different beams are associated:
First time: RV 0, 2 layers: TPMI=0, spatial beam 1;
Second time: RV 2, 2 layers: TPMI=0, spatial beam 2;
Third time: RV 2, 2 layers: TPMI=0, spatial beam 1;
Fourth time: RV 1, 2 layers: TPMI=0, spatial beam 2.

For another field in this embodiment, more indication information with a same function may be included. This is not limited herein.

Figure 3:
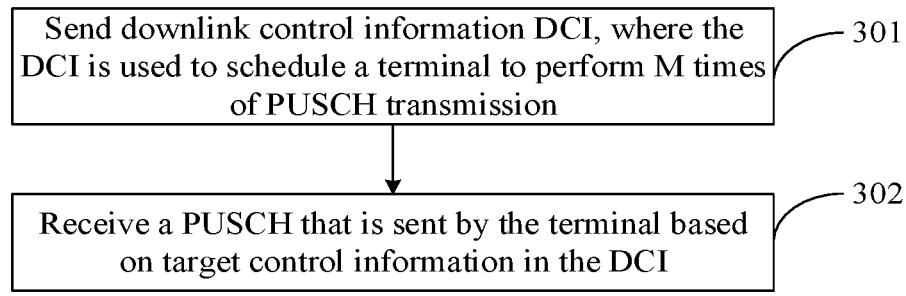
FIG. 3 is a flowchart of another PUSCH transmission method according to an embodiment of the present disclosure.

FIG. 3 is a flowchart of another PUSCH transmission method according to an embodiment of the present disclosure. The method is performed by a network device. As shown in FIG. 3, the method includes the following steps.

Step 301: Send downlink control information DCI, where the DCI is used to schedule a terminal to perform M times of PUSCH transmission, M is an integer greater than 1, and the DCI carries control information.

Step 302: Receive a PUSCH that is sent by the terminal based on target control information in the DCI.

A target identifier associated with the PUSCH is the same as a target identifier associated with the target control information, and target control information corresponding to PUSCHs in at least twice in the M times of PUSCH transmission is different.

The DCI includes N groups of indication information, each group of indication information in the N groups of indication information includes M pieces of first indication information used to indicate a same function, the M pieces of first indication information are in a one-to-one correspondence with M target identifiers, and N is a positive integer.

In some embodiments, an association relationship between the first indication information and the target identifier is specified in a protocol, configured by a network device, or reported by the terminal.

The M pieces of first indication information are in one indication field or M indication fields.

In some embodiments, when the M pieces of first indication information are in one indication field, the M pieces of first indication information are independently coded, or the M pieces of first indication information are jointly coded.

In some embodiments, when the M pieces of first indication information are in M indication fields, the M pieces of first indication information are independently coded.

The first indication information is indication information corresponding to a first indication field, and the first indication field includes at least one of a sounding reference signal resource indicator SRI field, a transmission precoding matrix indication layer and codebook indication field, a redundancy version field, a power control field, an antenna port field, an SRS request field, or a CSI request field.

In a case that M pieces of layer and codebook indication information corresponding to the layer and codebook indication field meet a preset condition, the first piece of layer and codebook indication field in the M pieces of layer and codebook indication information is used to indicate precoding information and the number of layers, and the last M−1 pieces of layer and codebook indication information are only used to indicate the precoding information; where the number of bits of the first piece of layer and codebook indication information is greater than or equal to the number of bits of any piece of layer and codebook indication information in the M−1 pieces of layer and codebook indication information, the M pieces of layer and codebook indication information are M pieces of first indication information corresponding to the layer and codebook indication field, and the preset condition includes any one of the following:

the M pieces of layer and codebook indication information are in a same indication field, and the M pieces of layer and codebook indication information are independently coded; or the M pieces of layer and codebook indication information are in M indication fields.

The first piece of layer and codebook indication information is the first piece in the M pieces of layer and codebook indication information in the DCI; or a target identifier associated with the first piece of layer and codebook indication information is the same as a target identifier associated with a PUSCH transmitted for the first time.

The DCI further includes at least one piece of second indication information, a function indicated by the second indication information is different from a function indicated by the first indication information, and the M times of PUSCH transmission are controlled based on the second indication information.

In some embodiments, a same target identifier is associated with at least one piece of spatial beam information.

In some embodiments, different target identifiers are associated with different spatial beam information.

The method further includes:

sending target information, where the target information is used to configure and/or indicate enable information, and the enable information includes target identifier enable or target identifier disable.

It should be noted that this embodiment is used as an implementation of a network device corresponding to the embodiment shown in FIG. 2. For a specific implementation of this embodiment, refer to related descriptions of the embodiment shown in FIG. 2, and a same beneficial effect can be achieved. To avoid repetition, details are not described herein again.

Figure 4:
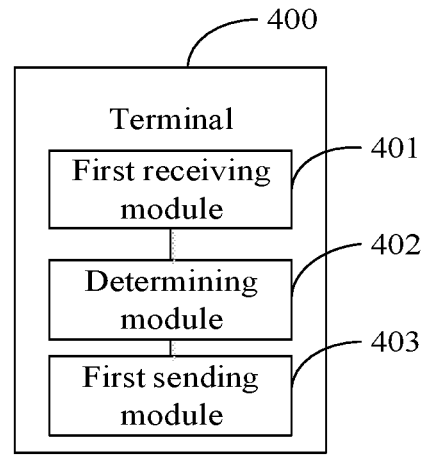
FIG. 4 is a structural diagram of a terminal according to an embodiment of the present disclosure.

FIG. 4 is a structural diagram of a terminal according to an embodiment of the present disclosure. As shown in FIG. 4, a terminal 400 includes:

a first receiving module 401, configured to receive downlink control information DCI, where the DCI is used to schedule M times of PUSCH transmission, and M is an integer greater than 1;

a determining module 402, configured to determine a target identifier associated with each PUSCH; and a first sending module 403, configured to send the PUSCH based on target control information that is in the DCI and that corresponds to the target identifier; where Target control information corresponding to PUSCHs in at least twice in the M times of PUSCH transmission is different.

The DCI includes N groups of indication information, each group of indication information in the N groups of indication information includes M pieces of first indication information used to indicate a same function, the M pieces of first indication information are in a one-to-one correspondence with M target identifiers, and N is a positive integer.

In some embodiments, an association relationship between the first indication information and the target identifier is specified in a protocol, configured by a network device, or reported by the terminal.

The M pieces of first indication information are in one indication field or M indication fields.

In some embodiments, when the M pieces of first indication information are in one indication field, the M pieces of first indication information are independently coded, or the M pieces of first indication information are jointly coded.

In some embodiments, when the M pieces of first indication information are in M indication fields, the M pieces of first indication information are independently coded.

The first indication information is indication information corresponding to a first indication field, and the first indication field includes at least one of a sounding reference signal resource indicator SRI field, a transmission precoding matrix indication layer and codebook indication field, a redundancy version field, a power control field, an antenna port field, an SRS request field, or a CSI request field.

In a case that M pieces of layer and codebook indication information corresponding to the layer and codebook indication field meet a preset condition, the first piece of layer and codebook indication field in the M pieces of layer and codebook indication information is used to indicate precoding information and the number of layers, and the last M−1 pieces of layer and codebook indication information are only used to indicate the precoding information; where the number of bits of the first piece of layer and codebook indication information is greater than or equal to the number of bits of any piece of layer and codebook indication information in the M−1 pieces of layer and codebook indication information, the M pieces of layer and codebook indication information are M pieces of first indication information corresponding to the layer and codebook indication field, and the preset condition includes any one of the following:

the M pieces of layer and codebook indication information are in a same indication field, and the M pieces of layer and codebook indication information are independently coded; or the M pieces of layer and codebook indication information are in M indication fields.

The first piece of layer and codebook indication information is the first piece in the M pieces of layer and codebook indication information in the DCI; or a target identifier associated with the first piece of layer and codebook indication information is the same as a target identifier associated with a PUSCH transmitted for the first time.

The DCI further includes at least one piece of second indication information, a function indicated by the second indication information is different from a function indicated by the first indication information, and the M times of PUSCH transmission are controlled based on the second indication information.

In some embodiments, a same target identifier is associated with at least one piece of spatial beam information.

In some embodiments, different target identifiers are associated with different spatial beam information.

The first receiving module 401 is further configured to: receive target information, where the target information is used to configure and/or indicate enable information, and the enable information includes target identifier enable or target identifier disable.

The terminal provided in this embodiment of the present disclosure can implement processes implemented by the terminal in the method embodiment of FIG. 4. To avoid repetition, details are not described herein again.

Figure 5:
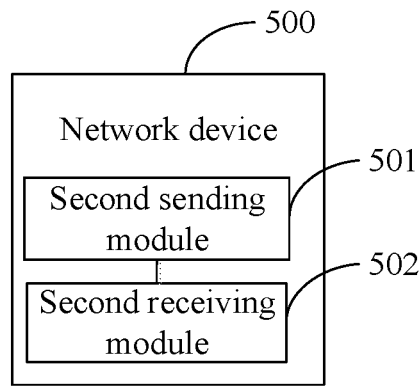
FIG. 5 is a structural diagram of a network device according to an embodiment of the present disclosure.

FIG. 5 is a structural diagram of a network device according to an embodiment of the present disclosure. As shown in FIG. 5, a network device 500 includes:

a second sending module 501, configured to send downlink control information DCI, where the DCI is used to schedule a terminal to perform M times of PUSCH transmission, M is an integer greater than 1, and the DCI carries control information; and a second receiving module 502, configured to receive a PUSCH that is sent by the terminal based on target control information in the DCI; where a target identifier associated with the PUSCH is the same as a target identifier associated with the target control information, and target control information corresponding to PUSCHs in at least twice in the M times of PUSCH transmission is different.

The DCI includes N groups of indication information, each group of indication information in the N groups of indication information includes M pieces of first indication information used to indicate a same function, the M pieces of first indication information are in a one-to-one correspondence with M target identifiers, and N is a positive integer.

In some embodiments, an association relationship between the first indication information and the target identifier is specified in a protocol, configured by a network device, or reported by the terminal.

The M pieces of first indication information are in one indication field or M indication fields.

In some embodiments, when the M pieces of first indication information are in one indication field, the M pieces of first indication information are independently coded, or the M pieces of first indication information are jointly coded.

In some embodiments, when the M pieces of first indication information are in M indication fields, the M pieces of first indication information are independently coded.

The first indication information is indication information corresponding to a first indication field, and the first indication field includes at least one of a sounding reference signal resource indicator SRI field, a transmission precoding matrix indication layer and codebook indication field, a redundancy version field, a power control field, an antenna port field, an SRS request field, or a CSI request field.

In a case that M pieces of layer and codebook indication information corresponding to the layer and codebook indication field meet a preset condition, the first piece of layer and codebook indication field in the M pieces of layer and codebook indication information is used to indicate precoding information and the number of layers, and the last M−1 pieces of layer and codebook indication information are only used to indicate the precoding information; where the number of bits of the first piece of layer and codebook indication information is greater than or equal to the number of bits of any piece of layer and codebook indication information in the M−1 pieces of layer and codebook indication information, the M pieces of layer and codebook indication information are M pieces of first indication information corresponding to the layer and codebook indication field, and the preset condition includes any one of the following:

the M pieces of layer and codebook indication information are in a same indication field, and the M pieces of layer and codebook indication information are independently coded; or the M pieces of layer and codebook indication information are in M indication fields.

The first piece of layer and codebook indication information is the first piece in the M pieces of layer and codebook indication information in the DCI; or a target identifier associated with the first piece of layer and codebook indication information is the same as a target identifier associated with a PUSCH transmitted for the first time.

The DCI further includes at least one piece of second indication information, a function indicated by the second indication information is different from a function indicated by the first indication information, and the M times of PUSCH transmission are controlled based on the second indication information.

In some embodiments, a same target identifier is associated with at least one piece of spatial beam information.

In some embodiments, different target identifiers are associated with different spatial beam information.

The second sending module 501 is further configured to:

send target information, where the target information is used to configure and/or indicate enable information, and the enable information includes target identifier enable or target identifier disable.

The network device provided in the embodiments of the present disclosure can implement processes implemented by the network device in the method embodiment of FIG. 2. To avoid repetition, details are not described herein again.

Figure 6:
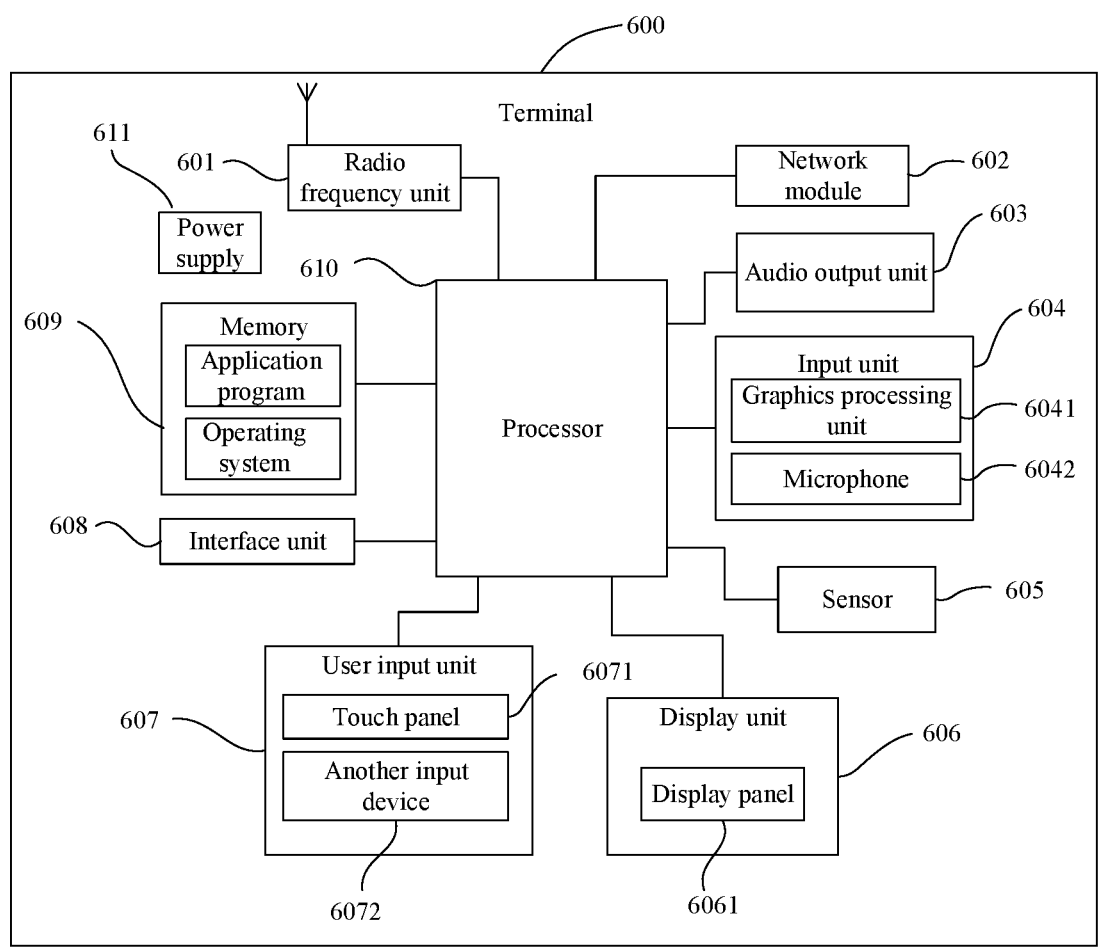
FIG. 6 is a structural diagram of another terminal according to an embodiment of the present disclosure.

FIG. 6 is a schematic diagram of a hardware structure of a terminal for implementing embodiments of the present disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that a structure of the terminal shown in FIG. 6 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The radio frequency unit 601 is configured to receive downlink control information DCI, where the DCI is used to schedule M times of PUSCH transmission, and M is an integer greater than 1.

The processor 610 is configured to determine a target identifier associated with each PUSCH.

The processor 610 is further configured to send the PUSCH based on target control information that is in the DCI and that corresponds to the target identifier.

Target control information corresponding to PUSCHs in at least twice in the M times of PUSCH transmission is different.

It should be understood that, in this embodiment, the processor 610 and the radio frequency unit 601 can implement processes implemented by the network in the method embodiment in FIG. 2. To avoid repetition, details are not described herein again.

It should be understood that, in this embodiment of the present disclosure, the radio frequency unit 601 may be configured to receive and send information or receive and send a signal in a call process. After downlink data from a base station is received, the processor 610 processes the downlink data. In addition, uplink data is sent to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device by using a wireless communication system.

The terminal provides wireless broadband Internet access for a user by using a network module 602, for example, helping the user send and receive an email, browsing a web page, and accessing streaming media.

The audio output unit 603 may convert audio data received by the radio frequency unit 601 or the network module 602 or stored in the memory 609 into an audio signal and output as sound. In addition, the audio output unit 603 may further provide audio output (for example, call signal receiving sound or message receiving sound) related to a specific function performed by the terminal 600. The audio output unit 603 includes a loudspeaker, a buzzer, a telephone receiver, and the like.

The input unit 604 is configured to receive an audio or video signal. The input unit 604 may include a Graphics Processing Unit (GPU) 6041 and a microphone 6042. The graphics processing unit 6041 processes image data of a static picture or a video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive sound and can process such sound into audio data. The processed audio data may be output by being converted into a format that may be sent to a mobile communications base station by using the radio frequency unit 601 in a telephone call mode.

The terminal 600 further includes at least one sensor 605, such as an optical sensor, a motion sensor, and another sensor. The optical sensor includes an ambient light sensor and a proximity sensor. The ambient light sensor may adjust luminance of the display panel 6061 based on brightness of ambient light, and the proximity sensor may disable the display panel 6061 and/or backlight when the terminal 600 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 605 may further include a fingerprint sensor, a pressure sensor, an iris sensor, a molecular sensor, a gyroscope, a barometer, a hygrometer, a thermometer, an infrared sensor, and the like. This is not described herein.

The display unit 606 is configured to display information entered by the user or information provided for the user. The display unit 606 may include a display panel 6061, and the display panel 6061 may be configured in a form of a Liquid Crystal Display (LCD), an Organic Light-Emitting Diode (OLED), or the like.

The user input unit 607 may be configured to receive input digit or character information and generate key signal input related to user setting and function control of a terminal. The user input unit 607 includes a touch panel 6071 and another input device 6072. The touch panel 6071, also referred to as a touchscreen, may collect a touch operation performed by the user on or near the touch panel 6071 (for example, an operation performed by the user on or near the touch panel 6071 by using any suitable object or accessory such as a finger or a stylus). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and can receive and execute a command sent by the processor 610. In addition, the touch panel 6071 may be implemented by using a plurality of types such as a resistive type, a capacitive type, an infrared ray, and a surface acoustic wave. The user input unit 607 may include another input device 6072 in addition to the touch panel 6071. The another input device 6072 may include but is not limited to one or more of a physical keyboard, a function key (such as a volume control key or an on/off key), a trackball, a mouse, a joystick, and the like. Details are not described herein.

Further, the touch panel 6071 may cover the display panel 6061. After detecting the touch operation on or near the touch panel 6071, the touch panel 6061 transmits the touch operation to the processor 610 to determine a type of a touch event, and then the processor 610 provides corresponding visual output on the display panel 6061 based on the type of the touch event. In FIG. 6, the touch panel 6071 and the display panel 6061 are used as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 608 may be configured to receive input (for example, data information and power) from the external apparatus and transmit the received input to one or more elements in the terminal 600, or may be configured to transmit data between the terminal 600 and the external apparatus.

The memory 609 may be configured to store a software program and various data. The memory 609 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 609 may include a high-speed random access memory, and may further include a non-volatile memory such as at least one magnetic disk storage component, a flash memory component, or another volatile solid-state storage component.

The processor 610 is a control center of the terminal, and is connected to all parts of the entire terminal by using various interfaces and lines, and performs various functions of the terminal and processes data by running or executing the software program and/or the module that are stored in the memory 609 and invoking the data stored in the memory 609, to implement overall monitoring on the terminal. The processor 610 may include one or more processing units. The processor 610 may be integrated with an application processor and a modem processor. The application processor mainly processes an operating system, a user interface, an application program, and the like, and the modem processor mainly processes wireless communication. It may be understood that the modem processor may not be integrated into the processor 610.

The terminal 600 may further include a power supply 611 (such as a battery) that supplies power to each component. Preferentially, the power supply 611 may be logically connected to the processor 610 by using a power management system, to implement functions such as charging, discharging, and power consumption management by using the power management system.

In addition, the terminal 600 includes some function modules not shown, and details are not described herein.

An embodiment of the present disclosure further provides a terminal, including a processor 610, a memory 609, and a computer program that is stored in the memory 609 and that can run on the processor 610. When the computer program is executed by the processor 610, each process of the embodiment of the foregoing PUSCH transmission method can be implemented, and a same technical effect can be achieved. To avoid repetition, details are not described herein again.

Figure 7:
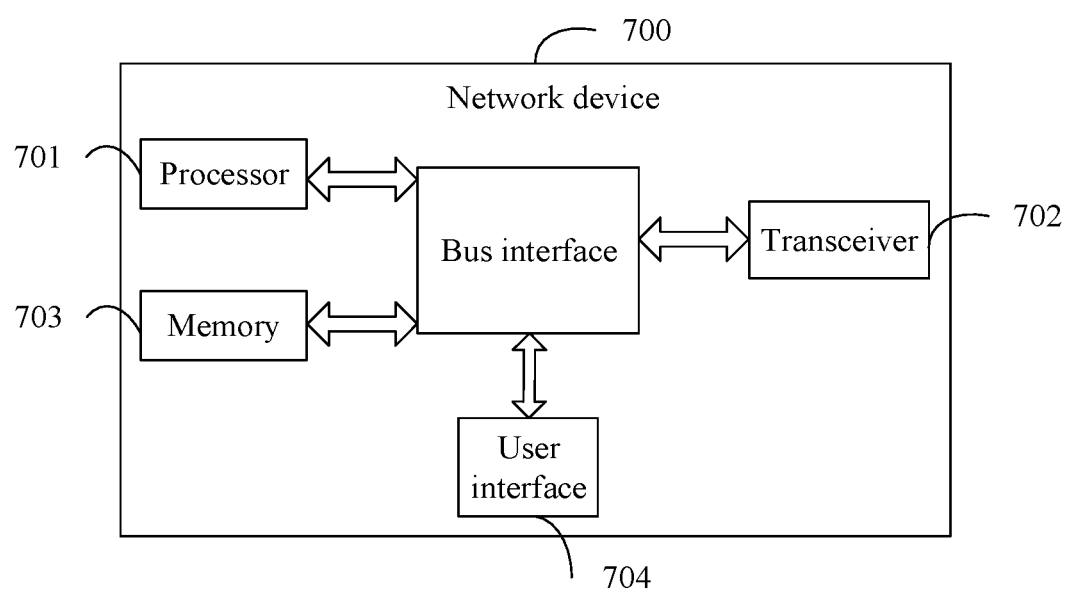
FIG. 7 is a structural diagram of another network device according to an embodiment of the present disclosure.

FIG. 7 is a structural diagram of another network device according to an embodiment of the present disclosure. As shown in FIG. 7, a network device 700 includes a processor 701, a transceiver 702, a memory 703, and a bus interface.

The transceiver 702 is configured to: send downlink control information DCI, where the DCI is used to schedule a terminal to perform M times of PUSCH transmission, M is an integer greater than 1, and the DCI carries control information; and receive a PUSCH that is sent by the terminal based on target control information in the DCI.

A target identifier associated with the PUSCH is the same as a target identifier associated with the target control information, and target control information corresponding to PUSCHs in at least twice in the M times of PUSCH transmission is different.

It should be understood that, in this embodiment, the processor 701 and the transceiver 702 can implement processes implemented by the network device in the method embodiment in FIG. 3. To avoid repetition, details are not described herein again.

In FIG. 7, a bus architecture may include any number of interconnected buses and bridges, and is linked by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides interfaces. The transceiver 702 may be multiple elements, in other words, includes a transmitter and a receiver, and provides a unit configured to communicate with various other apparatuses on a transmission medium. For different user equipment, the user interface 704 may further be an interface that can be externally or internally connected to a required device. The connected device includes but is not limited to a keypad, a display, a loudspeaker, a microphone, a joystick, and the like.

The processor 701 is responsible for managing the bus architecture and common processing, and the memory 703 may store data used when the processor 701 performs an operation.

An embodiment of the present disclosure further provides a network device, including a processor 701, a memory 703, and a computer program that is stored in the memory 703 and that can run on the processor 701. When the computer program is executed by the processor 701, each process of the embodiment of the foregoing PUSCH transmission method can be implemented, and a same technical effect can be achieved. To avoid repetition, details are not described herein again.

An embodiment of the present disclosure further provides a computer-readable storage medium. A computer program is stored in the computer-readable storage medium. When the computer program is executed by a processor, each process of an embodiment of a PUSCH transmission method on a network device side provided in the embodiments of the present disclosure is implemented, or when the computer program is executed by a processor, each process of an embodiment of a PUSCH transmission method on a terminal side provided in the embodiments of the present disclosure is implemented, and a same technical effect can be achieved. To avoid repetition, details are not described herein again. The computer-readable storage medium includes a Read-Only Memory (ROM), a Random Access Memory (RAM), a magnetic disk, an optical disc, or the like.

It may be understood that the embodiments described in the present disclosure may be implemented by hardware, software, firmware, middleware, microcode, or a combination thereof. For hardware implementation, a module, a unit, a submodule, a subunit, or the like may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions in this application, or a combination thereof.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a base station) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A method for physical uplink shared channel (PUSCH) transmission, performed by a terminal, comprising:
   receiving downlink control information (DCI), wherein the DCI is used to schedule M times of PUSCH transmission, and M is an integer greater than 1;
   determining a target identifier associated with each PUSCH in the M times of PUSCH transmission; and
   sending the PUSCH based on target control information that is in the DCI and that corresponds to the target identifier,
   wherein the target control information corresponding to at least two PUSCHs in the M times of PUSCH transmission is different; and
   the DCI comprises N indication fields, each indication field in the N indication fields comprises first indication information used to indicate a same function, the first indication information is in a one-to-one correspondence with the target identifier, and N is a positive integer, the number of the target identifier is greater than 1.

2. The method according to claim 1, wherein an association relationship between the first indication information and the target identifier is specified in a protocol, configured by a network device, or reported by the terminal.

3. The method according to claim 1, wherein N pieces of first indication information are in one indication field or N indication fields;
   when the N pieces of first indication information are in one indication field, the N pieces of first indication information are independently coded, or the N pieces of first indication information are jointly coded; and
   when the N pieces of first indication information are in N indication fields, the N pieces of first indication information are independently coded.

4. The method according to claim 1, wherein the first indication information is indication information corresponding to a first indication field, and the first indication field comprises at least one of a sounding reference signal resource indicator (SRI) field, a layer and codebook indication field, a redundancy version field, a power control field, an antenna port field, a sounding reference signal (SRS) request field, or a channel state information (CSI) request field.

5. The method according to claim 4, wherein when N pieces of layer and codebook indication information corresponding to the layer and codebook indication field meet a preset condition, the first piece of layer and codebook indication information in the N pieces of layer and codebook indication information is used to indicate precoding information and the number of layers, and the last N−1 pieces of layer and codebook indication information are only used to indicate the precoding information, wherein:
   the number of bits of the first piece of layer and codebook indication information is greater than or equal to the number of bits of any piece of layer and codebook indication information in the N−1 pieces of layer and codebook indication information, the N pieces of layer and codebook indication information are N pieces of first indication information corresponding to the layer and codebook indication field, and the preset condition comprises any one of the following:
   the N pieces of layer and codebook indication information are in a same indication field, and the N pieces of layer and codebook indication information are independently coded; or
   the N pieces of layer and codebook indication information are in N indication fields.

6. The method according to claim 5, wherein the first piece of layer and codebook indication information is a first piece in the N pieces of layer and codebook indication information in the DCI; or
   a target identifier associated with the first piece of layer and codebook indication information is the same as a target identifier associated with a PUSCH transmitted for the first time.

7. The method according to claim 1, wherein the DCI further comprises at least one piece of second indication information, a function indicated by the second indication information is different from a function indicated by the first indication information, and the M times of PUSCH transmission are controlled based on the second indication information.

8. The method according to claim 1, wherein the same target identifier is associated with at least one piece of spatial beam information; or
   different target identifiers are associated with different spatial beam information.

9. A method for physical uplink shared channel (PUSCH) transmission, performed by a network device, comprising:
   sending downlink control information (DCI), wherein the DCI is used to schedule a terminal to perform M times of PUSCH transmission, M is an integer greater than 1, and the DCI carries control information; and
   receiving a PUSCH that is sent by the terminal based on target control information in the DCI,
   wherein a target identifier associated with the PUSCH is the same as a target identifier associated with the target control information, and target control information corresponding to PUSCHs in at least twice in the M times of PUSCH transmission is different; and
   the DCI comprises N indication fields, each indication field in the N indication fields comprises first indication information used to indicate a same function, the first indication information is in a one-to-one correspondence with the target identifier, and N is a positive integer, the number of the target identifier is greater than 1.

10. The method according to claim 9, wherein an association relationship between the first indication information and the target identifier is specified in a protocol, configured by a network device, or reported by the terminal.

11. The method according to claim 9, wherein N pieces of first indication information are in one indication field or N indication fields;
   when the N pieces of first indication information are in one indication field, the N pieces of first indication information are independently coded, or the N pieces of first indication information are jointly coded; and
   when the N pieces of first indication information are in N indication fields, the N pieces of first indication information are independently coded.

12. The method according to claim 9, wherein the first indication information is indication information corresponding to a first indication field, and the first indication field comprises at least one of a sounding reference signal resource indicator (SRI) field, a layer and codebook indication field, a redundancy version field, a power control field, an antenna port field, a sounding reference signal (SRS) request field, or a channel state information (CSI) request field.

13. The method according to claim 12, wherein when N pieces of layer and codebook indication information corresponding to the layer and codebook indication field meet a preset condition, the first piece of layer and codebook indication information in the N pieces of layer and codebook indication information is used to indicate precoding information and the number of layers, and the last N−1 pieces of layer and codebook indication information are only used to indicate the precoding information, wherein:

the number of bits of the first piece of layer and codebook indication information is greater than or equal to the number of bits of any piece of layer and codebook indication information in the N−1 pieces of layer and codebook indication information, the N pieces of layer and codebook indication information are N pieces of first indication information corresponding to the layer and codebook indication field, and the preset condition comprises any one of the following:

the N pieces of layer and codebook indication information are in a same indication field, and the N pieces of layer and codebook indication information are independently coded; or the N pieces of layer and codebook indication information are in N indication fields.

14. The method according to claim 13, wherein the first piece of layer and codebook indication information is a first piece in the N pieces of layer and codebook indication information in the DCI; or a target identifier associated with the first piece of layer and codebook indication information is the same as a target identifier associated with a PUSCH transmitted for the first time.

15. The method according to claim 9, wherein the DCI further comprises at least one piece of second indication information, a function indicated by the second indication information is different from a function indicated by the first indication information, and the M times of PUSCH transmission are controlled based on the second indication information.

16. The method according to claim 9, wherein the same target identifier is associated with at least one piece of spatial beam information; or different target identifiers are associated with different spatial beam information.

17. A network device, comprising: a memory, a processor, and a program that is stored in the memory and that can run on the processor, wherein when the program is executed by the processor, steps in the PUSCH transmission method according to claim 10 are implemented.

18. A terminal, comprising:
a memory storing a computer program; and
a processor coupled to the memory and configured to execute the computer program to perform a method for physical uplink shared channel (PUSCH) transmission, the method comprising:
receiving downlink control information (DCI), wherein the DCI is used to schedule M times of PUSCH transmission, and M is an integer greater than 1;
determining a target identifier associated with each PUSCH in the M times of PUSCH transmission; and
sending the PUSCH based on target control information that is in the DCI and that corresponds to the target identifier,
wherein the target control information corresponding to at least two PUSCHs in the M times of PUSCH transmission is different; and
the DCI comprises N indication fields, each indication field in the N indication fields comprises first indication information used to indicate a same function, the first indication information is in a one-to-one correspondence with the target identifier, and N is a positive integer, the number of the target identifier is greater than 1.

* * * * *